United States Patent [19]

Squyres

[11] Patent Number: 4,502,355
[45] Date of Patent: Mar. 5, 1985

[54] BICYCLE TUBE REPAIR DEVICE

[76] Inventor: Bobby R. Squyres, 434 E. Hutchins Pl., San Antonio, Tex. 78221

[21] Appl. No.: 490,832

[22] Filed: May 2, 1983

[51] Int. Cl.³ .................... B60C 21/00; B60C 25/16
[52] U.S. Cl. .................................... 81/15.2; 156/97; 152/370
[58] Field of Search .................... 81/15.7, 15.5, 15.2; 152/367, 370, 368; 156/97

[56] References Cited

U.S. PATENT DOCUMENTS

| 614,287 | 11/1898 | Call | 81/15.5 |
| 3,035,626 | 5/1962 | Mullen | 156/97 |

FOREIGN PATENT DOCUMENTS

| 601034 | 7/1960 | Canada | 81/15.7 |
| 277150 | 9/1927 | United Kingdom | 152/370 |
| 953509 | 3/1964 | United Kingdom | 152/368 |

Primary Examiner—Roscoe V. Parker
Attorney, Agent, or Firm—Ranseler O. Wyatt

[57] ABSTRACT

A bicycle tube repair device having a spherical rubber member from which strands of rubber bands extend, the spherical member being adapted to be forced through a rupture in a tube to repair punctures, particularly those too large to be repaired by tube repair fluid, thus avoiding the necessity of replacing the tube. The tube is removed from the casing and the rubber member is inserted through the puncture in the tube, and the rubber bands are used to draw the rubber member tightly against the puncture on the inner surface of the tube and the tube then returned to the tire casing, leaving the rubber bands positioned between the tube and casing, and subjecting the spherical member to repair fluid which has been inserted in the tubing, so that the puncture will be repaired by pressing of the said spherical member against the puncture in the tube at the point of rupture, and sealing said rupture, with the rubber bands assisting in maintaining the device in position in the tube when the tube is inflated lodging the bands tightly between the tube and casing.

6 Claims, 3 Drawing Figures

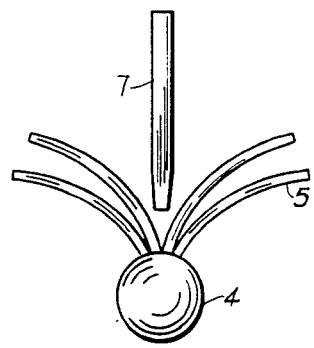
FIG. 1
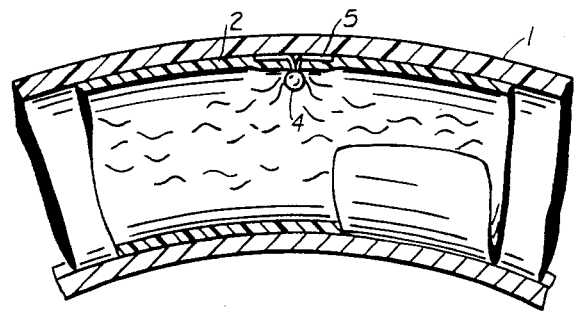
FIG. 2
FIG. 3
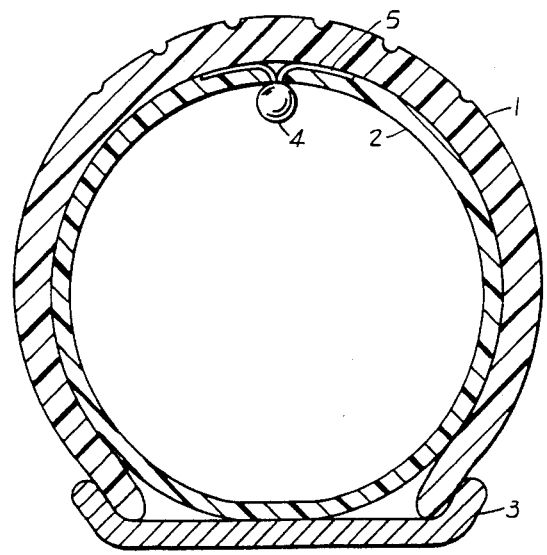

BICYCLE TUBE REPAIR DEVICE

SUMMARY OF THE INVENTION

A tool for repairing ruptures in bicycle tire tubes consisting of a spherical rubber member having a plurality of rubber bands extending from and integral with the surface of the spherical member, and having a tool for forcing the spherical member through the rupture in the tube, exposing the spherical member to a liquid tube repair inserted in the tube, and adhering said spherical member to the tube at the point of rupture, with the rubber bands remaining between the tube and the casing to further assist in maintaining the sherical member in place when the tube is inflated.

BRIEF DESCRIPTION OF THE DRAWINGS

FIG. 1 is an elevational view of the device, showing the application tool in position to force the spherical member into a rupture in a tire tube.

FIG. 2 is an elevational view, in cross section, of a casing and tube, showing the device mounted in a rupture in a tube, and FIG. 3 is a cross sectional end view of a tire mounted on a rim, showing the spherical member in place in the tube.

DESCRIPTION OF THE PREFERRED EMBODIMENTS

In the drawings, the numeral 1 designates a bicycle tire casing, in which the usual tube 2 is mounted. A liquid repair substance is introduced into the tube 2 in the usual manner and the complete tire is mounted on the rim 3, in the usual manner. When a rupture occurs, often a perforation caused by a nail, or the like, which is too large to be repaired by the liquid repair fluid normally first introduced into the tire to make puncture repairs, the tire is removed from the rim and the tube is removed from the casing, and the spherical member 4, which may be formed of rubber, or flexible plastic, or the like, with strands of rubber, or the like, in the form of bands, as 5, integral with the spherical member, and extending from said member, which are spread substantially in equal numbers in opposing directions, and the spherical member 4 is forced through the rupture into the tube. A mounting tool 7, which may consist of a rectangular, rigid, narrow bar, slightly tapered at one end, is employed to thrust the spherical member 4 through the puncture, the member 4 being placed on the puncture at its outer terminal in the tube and the bar 7 is employed to force the spherical member through the puncture in the tube, the tapered end of the bar 7 being placed against the spherical member between the two groups of bands 5, and the spherical member pushed through the puncture by means of the bar. The rubber bands 5 are employed to draw the spherical member 4 tightly against the puncture, and the tube is then returned to the casing, and the casing mounted on the rim with the rubber bands 5 positioned between the tube and casing. When the spherical member is in this position, air is introduced into the tube, and the spherical member will be maintained against the puncture by the air pressure. The liquid repair material in the tube will assist in sealing the spherical member against the tubing and the air pressure in the tubing will maintain the bands 5 tightly between the tubing and casing, assisting in maintaining the spherical member in puncture sealing position.

The spherical member 4 may be in many sizes, from BB to the size of a marble, and in repairing a tube, the size suitable for the puncture may be selected. In use this repair device requires no cleaning or buffing of the tube and once the spherical member 4 is installed, the device will not become detached, nor will air bubbles form under the spherical member 4, as is often the case in the use of common cold or hot patches, presently employed in bicycle tube repair. The size of the device makes it readily adaptable to back packing, and not only saves the expense of replacing the tube, which would otherwise be necessary, but is much easier to carry than a spare tube.

What I claim is:

1. In a bicycle tube repair device for repairing bicycle tire tubes mounted in tire casings adapted for use on bicycle wheels, a spherical member of a yieldable material, bands of a similar material integral with and extending from said spherical member adapted to be lodged between the tube and casing when the tire is in assembled relation and means for forcing said spherical member through a puncture in the tube.

2. The device defined in claim 1 wherein a liquid repair fluid introduced into said tube will react on said spherical member to cause said member to adhere to the material of the tube around the puncture to assist the said bands in maintaining the spherical member in place.

3. The device defined in claim 1 having a detached tapered rigid bar adapted to be positioned against said spherical member between said bands and employed to force the spherical member through the puncture in the tube.

4. The device defined in claim 1 wherein a plurality of yieldable spherical members of various diameter and extending bands on each spherical member, are provided for selective use in repairing the puncture.

5. The device defined in claim 1 wherein the air pressure within the tube bears against said spherical member and assists in fitting the member in the puncture and in maintaining the spherical member in sealing position.

6. The device defined in claim 1 wherein said bands are employed to draw the spherical member into puncture sealing position in the tube prior to assembly of the tire and to lock said spherical member in sealing position after assembly of the tube and casing and the introduction of air into the tube.

* * * * *